United States Patent
Ranki et al.

(10) Patent No.: US 9,301,089 B2
(45) Date of Patent: Mar. 29, 2016

(54) HANDLING COMPLEX SIGNAL PARAMETERS BY A POSITIONING DEVICE, AND APPARATUS

(75) Inventors: Ville Valtteri Ranki, Jorvas (FI); Antti Paavo Tapani Kainulainen, Nummela (FI); Fabio Belloni, Espoo (FI)

(73) Assignee: Nokia Technologies Oy, Espoo (FI)

( * ) Notice: Subject to any disclaimer, the term of this patent is extended or adjusted under 35 U.S.C. 154(b) by 315 days.

(21) Appl. No.: 13/876,996

(22) PCT Filed: Sep. 30, 2010

(86) PCT No.: PCT/IB2010/054426
§ 371 (c)(1),
(2), (4) Date: Aug. 27, 2013

(87) PCT Pub. No.: WO2012/042303
PCT Pub. Date: Apr. 5, 2012

(65) Prior Publication Data
US 2013/0331120 A1      Dec. 12, 2013

(51) Int. Cl.
  G01S 3/14        (2006.01)
  G01S 5/02        (2010.01)
  G01S 5/12        (2006.01)
  H04W 4/02        (2009.01)
  H04W 64/00       (2009.01)

(52) U.S. Cl.
  CPC .. *H04W 4/02* (2013.01); *G01S 3/14* (2013.01); *G01S 5/02* (2013.01); *G01S 5/12* (2013.01); *H04W 64/00* (2013.01)

(58) Field of Classification Search
  CPC ............... G01S 3/14; G01S 5/02; G01S 5/12; H04W 4/02; H04W 64/00
  See application file for complete search history.

(56) References Cited

U.S. PATENT DOCUMENTS

2005/0185618 A1   8/2005  Friday et al.
2009/0318140 A1  12/2009  Gamel et al.

FOREIGN PATENT DOCUMENTS

| CN | 1528101 A | 9/2004 |
| CN | 1938996 A | 3/2007 |
| CN | 101169477 A | 4/2008 |
| CN | 101583190 A | 11/2009 |
| EP | 1901086 | 3/2008 |
| WO | WO02/082832 A2 | 10/2002 |
| WO | WO2009056150 | 5/2009 |
| WO | WO2009065063 | 5/2009 |

OTHER PUBLICATIONS

International Search Report for International Application No. PCT/IB2010/054426—Date of Completion of Search: Jun. 14, 2011, 5 pages.
Chinese Search Report for CN App. No. 2010800700259—Dated: Jun. 25, 2015, 2 pages.
English Language Machine Translation of Chinese Patent Application Publication No. CN101583190A—6 pages.
English Language Machine Translation of Chinese Patent Application Publication No. CN1528101A—62 pages.
English Language Machine Translation of Chinese Patent Application Publication No. CN101169477A —14 pages.
English Language Machine Translation of Chinese Patent Application Publication No. CN1938996A—6 pages.

*Primary Examiner* — Nam Huynh
(74) *Attorney, Agent, or Firm* — Locke Lord LLP

(57) ABSTRACT

An exemplary method includes: receiving at each of at least three antenna elements of a positioning device a wireless signal having modulated thereon an identifier relating to a transmitting device; obtaining complex signal parameters of a signal received at each of the at least three antenna elements; determining a measure of a strength of the received wireless signal; comparing the measure to a threshold associated with the identifier; if the measure exceeds the threshold, processing the complex signal parameters to determine a bearing of the transmitting device from the positioning device; and if the measure does not exceed the threshold, discarding the complex signal parameters without processing them to determine a bearing. An exemplary apparatus and computer readable medium configured to perform the method are also disclosed.

12 Claims, 6 Drawing Sheets

HANDLING COMPLEX SIGNAL PARAMETERS BY A POSITIONING DEVICE, AND APPARATUS

FIELD OF THE INVENTION

This invention relates generally to positioning.

BACKGROUND TO THE INVENTION

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

SUMMARY OF THE INVENTION

A first aspect of the invention provides a method comprising:
  receiving at each of at least three antenna elements of a positioning device a wireless signal having modulated thereon an identifier relating to a transmitting device;
  obtaining complex signal parameters of a signal received at each of the at least three antenna elements;
  determining a measure of a strength of the received wireless signal;
  comparing the measure to a threshold associated with the identifier;
  if the measure exceeds the threshold, processing the complex signal parameters to determine a bearing of the transmitting device from the positioning device, and
  if the measure does not exceed the threshold, discarding the complex signal parameters without processing them to determine a bearing.

The method may comprise the positioning device comparing the measure to the threshold associated with the identifier, the positioning device transmitting a message comprising the complex signal parameters for remote processing to determine the bearing of the transmitting device from the positioning device if the measure exceeds the threshold, and the positioning device discarding the complex signal parameters without first transmitting them if the measure does not exceed the threshold.

The method may comprise storing a database of identifiers and corresponding thresholds, or information from which thresholds can be derived. Here, the method may comprise updating the database using information received from an external device, for instance a remote server.

The method may comprise:
  storing a list of disallowed mobile devices;
  determining if an identifier received from a transmitting device relates to a mobile device that is included in the list of disallowed mobile devices; and
  in the event of a positive determination, discarding the complex signal parameters without processing them to determine a bearing.

A second aspect of the invention comprises a method comprising:
  receiving messages from plural positioning devices;
  decoding from a message received from a first positioning device information identifying a mobile device and a signal strength measure relating to a strength of a signal received from the mobile device at the first positioning device;
  using the signal strength measure to calculate a threshold signal strength; and
  distributing the threshold signal strength to the plural positioning devices.

Using the signal strength measure to calculate a threshold signal strength may comprise:
  comparing the signal strength measure to a maximum signal strength measure corresponding to the mobile device and relating to a time within a predetermined time window;
  disregarding the signal strength measure if the maximum signal strength measure is not exceeded, and
  providing the signal strength measure as the threshold signal strength if the threshold is exceeded.

Alternatively, using the signal strength measure to calculate a threshold signal strength may comprise:
  updating a record in a list with the signal strength measure if the threshold is exceeded; and
  adding a new record to the list with the signal strength measure if the threshold is not exceeded.

The method may comprise maintaining a list of disallowed mobile devices, and distributing the list to the plural positioning devices.

The measure of strength of the received wireless signal may be signal power.

A third aspect of the invention provides a computer program, optionally stored on a computer readable medium, comprising machine readable instructions that when executed by computer apparatus control it to perform the method of any preceding claim.

A fourth aspect of the invention provides apparatus comprising:
  means for obtaining complex signal parameters for a signal received at each of at least three antenna elements, the wireless signal having modulated thereon an identifier relating to a transmitting device;
  means for determining a measure of a strength of the received wireless signal;
  means for comparing the measure to a threshold associated with the identifier;
  means responsive to a determination that the measure exceeds the threshold to process the complex signal parameters to determine a bearing of the transmitting device from the positioning device, and
  means responsive to a determination that the measure does not exceed the threshold to discard the complex signal parameters without processing them to determine a bearing.

The apparatus may comprise means for comparing the measure to the threshold associated with the identifier, the apparatus being configured to transmit a message comprising the complex signal parameters for remote processing if the measure exceeds the threshold and to discard the complex signal parameters without first transmitting them if the measure does not exceed the threshold.

The apparatus may comprise a memory storing a database of identifiers and corresponding thresholds, or information from which thresholds can be derived. The apparatus may be configured to update the database using information received from a remote server.

The memory may store a list of disallowed mobile devices, and the apparatus may be configured to determine if an identifier received from a transmitting device relates to a mobile device that is included in the list of disallowed mobile devices and, in the event of a positive determination, to discard the complex signal parameters without processing them to determine a bearing.

A fifth aspect of the invention provides apparatus comprising:
   means for receiving messages from plural positioning devices;
   means for decoding from a message received from a first positioning device information identifying a mobile device and a signal strength measure relating to a strength of a signal received from the mobile device at the first positioning device;
   means for using the signal strength measure to calculate a threshold signal strength; and
   means for distributing the threshold signal strength to the plural positioning devices.

The means for using the signal strength measure to calculate a threshold signal strength may be configured:
   to compare the signal strength measure to a maximum signal strength measure corresponding to the mobile device and relating to a time within a predetermined time window;
   to disregard the signal strength measure if the maximum signal strength measure is not exceeded, and
   to provide the signal strength measure as the threshold signal strength if the threshold is exceeded.

Alternatively, the means for using the signal strength measure to calculate a threshold signal strength may be configured:
   to update a record in a list with the signal strength measure if the threshold is exceeded; and
   to add a new record to the list with the signal strength measure if the threshold is not exceeded.

The apparatus may be configured to maintain a list of disallowed mobile devices, and to distribute the list to the plural positioning receivers.

The measure of strength of the received wireless signal may be signal power.

A sixth aspect of the invention provides a machine readable medium having stored thereon computer code that when executed by computer apparatus controls it to perform a method comprising:
   obtaining complex signal parameters of a wireless signal received at each of at least three antenna elements of a positioning device;
   determining a measure of a strength of the received wireless signal;
   comparing the measure to a threshold associated with an identifier modulated onto the received wireless signal;
   if the measure exceeds the threshold, processing the complex signal parameters to determine a bearing of the transmitting device from the positioning device, and
   if the measure does not exceed the threshold, discarding the complex signal parameters without processing them to determine a bearing.

A seventh aspect of the invention provides a machine readable medium having stored thereon computer code that when executed by computer apparatus controls it to perform a method comprising:
   receiving messages from plural positioning devices;
   decoding from a message received from a first positioning device information identifying a mobile device and a signal strength measure relating to a strength of a signal received from the mobile device at the first positioning device;
   using the signal strength measure to calculate a threshold signal strength; and
   distributing the threshold signal strength to the plural positioning devices.

An eighth aspect of the invention provides apparatus comprising one or more processors, one or more memories and computer code stored in the one or more memories, the one or more processors being operable under control of the computer code to:
   obtain complex signal parameters for a signal received at each of at least three antenna elements, the wireless signal having modulated thereon an identifier relating to a transmitting device;
   determine a measure of a strength of the received wireless signal;
   compare the measure to a threshold associated with the identifier;
   respond to a determination that the measure exceeds the threshold by processing the complex signal parameters to determine a bearing of the transmitting device from the positioning device, and
   respond to a determination that the measure does not exceed the threshold by discarding the complex signal parameters without processing them to determine a bearing.

A ninth aspect of the invention provides apparatus comprising one or more processors, one or more memories and computer code stored in the one or more memories, the one or more processors being operable under control of the computer code to:
   receive messages from plural positioning devices;
   decode from a message received from a first positioning device information identifying a mobile device and a signal strength measure relating to a strength of a signal received from the mobile device at the first positioning device;
   use the signal strength measure to calculate a threshold signal strength; and
   distribute the threshold signal strength to the plural positioning devices.

BRIEF DESCRIPTION OF THE DRAWINGS

For a better understanding of various embodiments of the present invention reference will now be made by way of example only to the accompanying drawings in which.

DETAILED DESCRIPTION OF EMBODIMENTS OF THE INVENTION

Figure 1:
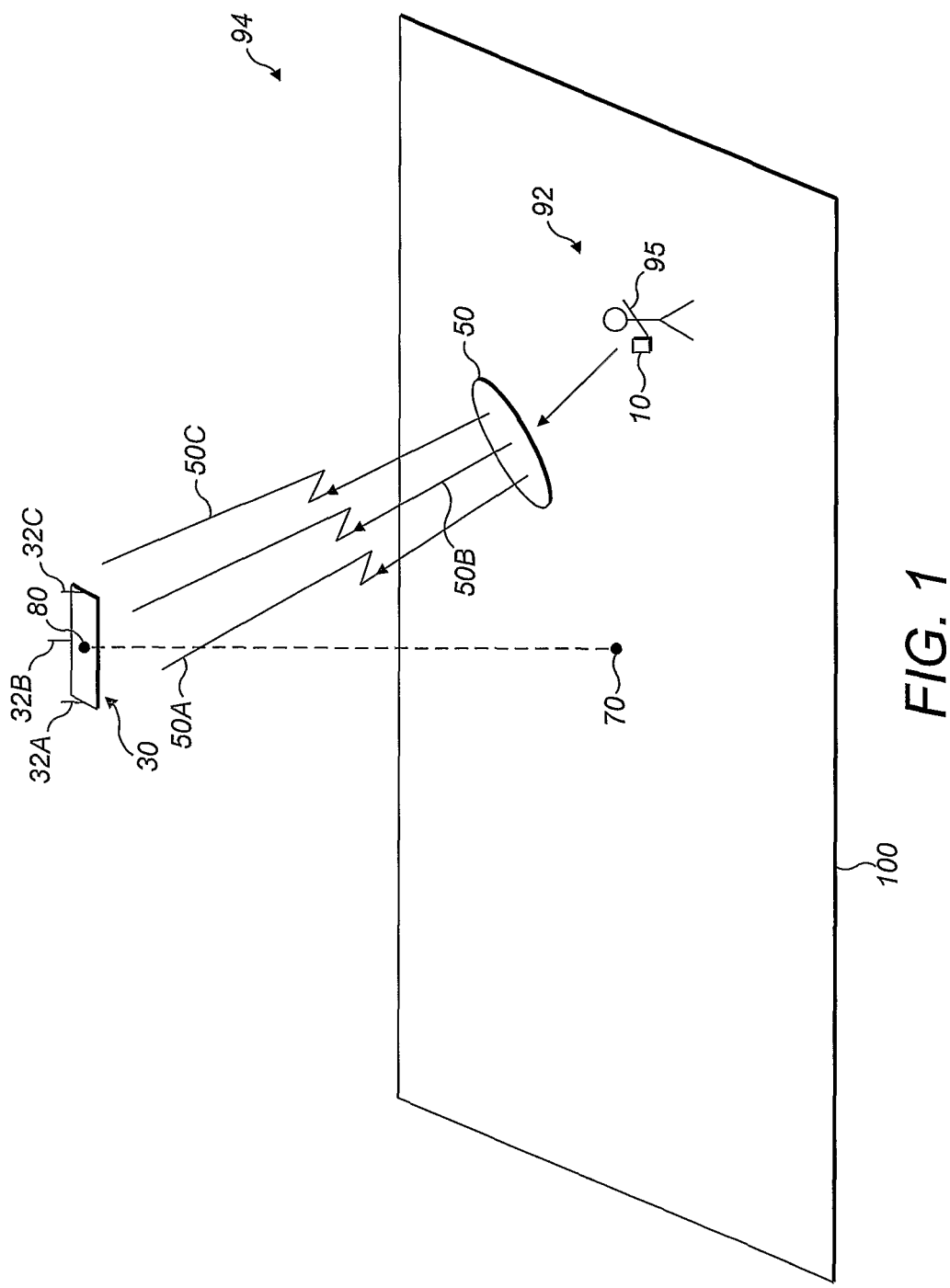
FIG. 1 illustrates a base station apparatus according to aspects of the invention receiving radio signals from a transmitter according to other aspects of the invention.

FIG. 1 illustrates a person 92 (carrying a mobile radio communications apparatus 10) at a position 95 on a floor 100 of a building 94. The building 94 could be, for example, a shopping centre or a conference centre. The mobile radio communications apparatus 10 is hereafter referred to as a mobile device. The mobile device 10 includes radio transmitter functionality and so can be called a transmitter. The mobile device 10 is operable to transmit radio signals that are receivable by the base station 30, for instance Bluetooth Low Energy protocol signals.

A base station receiver apparatus 30 is positioned at a location 80 of the building 94. In the illustrated example, the location 80 is on the ceiling of the building 94 (i.e. the overhead interior surface) but in other implementations the receiver may be placed elsewhere, such as on a wall or within an under-floor cavity. For reasons that will become apparent, the base station receiver apparatus 30 can be termed a positioning device or positioning receiver.

The location 80 is directly above the point denoted with the reference numeral 70 on the floor 100 of the building. The base station 30 is for enabling the position of the mobile device 10 to be determined, although that is not necessarily the only function provided by the base station 30. For example, the base station 30 may be part of a transceiver for providing wireless internet access to users of apparatuses 10, for example, via wireless local area network (WLAN) or Bluetooth Low Energy radio signals.

Briefly, the mobile device 10 transmits signals which are received at the base station 30. The base station 30 takes I and Q samples of the received signals. These I and Q samples are processed to determine a bearing of the mobile device 10 from the base station 30. From the bearing, the location of the mobile device 10 may be calculated. In a primary embodiment, described below, calculation of the bearing from the I and Q samples, or alternatively from part-processed I and Q samples, is performed at a server 48. I and Q samples or part-processed samples of the received signals are sent from the base station 30 to the server 48 only if a measure of signal strength of the received signals meets a predetermined criterion. In other embodiments, determination as to whether the measure of signal strength meets the predetermined criterion is performed by another component of the system, for instance the server 48 or the mobile device 10. In other embodiments, the base station apparatus 30 compared the measure of strength to the predetermined criterion and itself calculates a bearing of the mobile device 10 from the base station apparatus 30 if the criterion is met.

The position 95 of the person 92 is defined by specifying a position along a bearing 82 (illustrated in FIG. 5) which runs from the location 80 of the base station 30 through the location 95 of the mobile device 10. The bearing 82 is defined by an elevation angle θ and an azimuth angle φ.

The mobile device 10 may, for example, be a hand portable electronic device such as a mobile radiotelephone. The mobile device 10 may or may not include a positioning receiver such as a GPS receiver. The mobile device 10 may be a relatively simple device having limited functionality, such as a mobile tag. Here, the mobile tag 10 may be absent of a receiver. A mobile tag is absent of voice communication capability, and may also be absent of a display and audio transducers.

The mobile device 10 may transmit radio signals 50 periodically as beacons. The radio signals may, for example, have a transmission range of 100 meters or less. For example, the radio signals may be 802.11 wireless local area network (WLAN) signals, Bluetooth signals, Ultra wideband (UWB) signals or Zigbee signals. In the following embodiments, the radio signals preferably are signals transmitted according to the Bluetooth Low Energy protocol.

Figure 2:
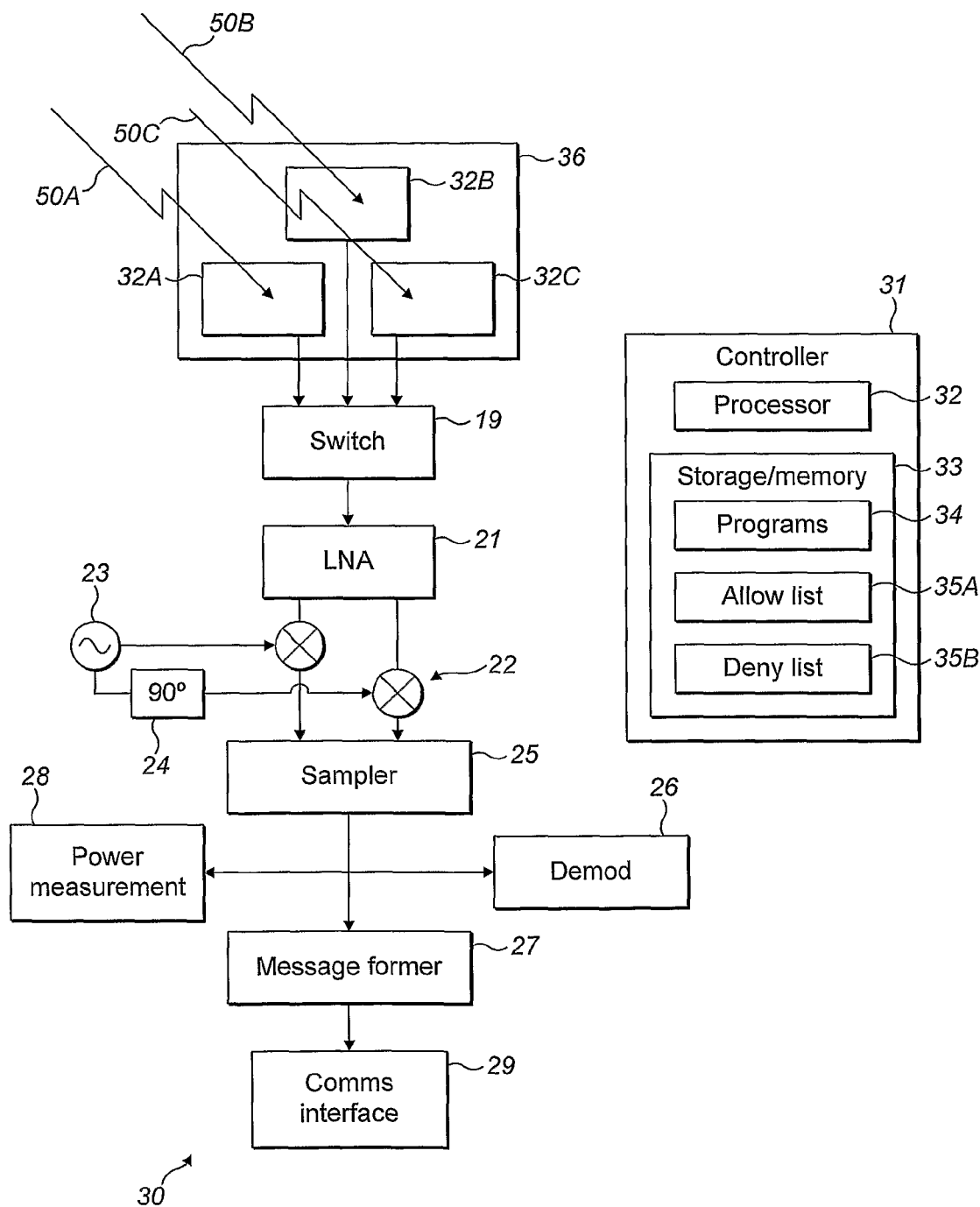
FIG. 2 is a schematic diagram of the base station apparatus according to aspects of the invention.

FIG. 2 schematically illustrates one example of the base station 30. The base station 30 comprises an antenna array 36 comprising a plurality of antenna elements 32A, 32B, 32C which receive respective radio signals 50A, 50B, 50C transmitted from the mobile device 10. Although three antenna elements 32 are shown, three is the minimum and the embodiments described here may include more, for instance 16 elements.

Each of the plurality of antenna elements 32A, 32B, 32C is connected to an switch 19, which is controllable by a controller 31 as described below. The switch 19 is controlled so that only one of the antenna elements 32A, 32B, 32C is connected to an amplifier 21 at a given time. The output of the amplifier 21 are received at a mixer arrangement 22. This is provided with in-phase (I) and quadrature (Q) signals by an arrangement of a local oscillator 23, which may be analogue or digital, and a 90° phase shifter 24. A sampler 25 is configured to receive I and Q output signals from the mixer arrangement and take digital samples thereof. The sampler 25 may take any suitable form, for instance including two digital to analogue converter (DAC) channels, one for the I channel and one for the Q channel. The effect of the mixer arrangement 24 and the sampler 25 is to downconvert the received signals and to provide digital I and Q samples of the downmixed signals.

An output of the sampler 25 is provided to a signal strength measurement module 28, a demodulator 26 and a message former 27.

A controller 31 is configured to control the other components of the base station apparatus 30. The controller may take any suitable form. For instance, it may comprise processing circuitry 32, including one or more processors, and a storage device 33, comprising a single memory unit or a plurality of memory units. The storage device 33 may store computer program instructions 34 that, when loaded into processing circuitry 32, control the operation of the base station 30. The computer program instructions 34 may provide the logic and routines that enables the apparatus to perform the functionality described above, and also to perform the method described below with reference to FIG. 4. The message former 27 may be comprised solely of the controller 31. The computer program instructions 34 may arrive at the base station apparatus 30 via an electromagnetic carrier signal or be copied from a physical entity 21 such as a computer program product, a memory device or a record medium such as a CD-ROM or DVD.

The processing circuitry 32 may be any type of processing circuitry. For example, the processing circuitry 32 may be a programmable processor that interprets computer program instructions 34 and processes data. The processing circuitry 32 may include plural programmable processors. Alternatively, the processing circuitry 32 may be, for example, programmable hardware with embedded firmware. The processing circuitry 32 may be a single integrated circuit or a set of integrated circuits (i.e. a chipset). The processing circuitry 32 may also be a hardwired, application-specific integrated circuit (ASIC). The processing circuitry may be termed processing means.

The processing circuitry 32 is connected to write to and read from the storage device 33. The storage device 33 may be a single memory unit or a plurality of memory units.

The demodulator 26 is configured to demodulate data modulated onto signals received by the antenna elements 32A, 32B, 32C and extract therefrom an identifier relating to a mobile device that transmitted the received signals. This identifier is provided to the controller 31.

The controller 31 operates to control the switch 19 to connect the antenna elements 32A, 32B, 32C to the amplifier 21 in turn. The controller 31 controls the switch 19 to connect one of the antenna elements 32A, 32B, 32C to the amplifier for the duration of transmission of the header of a packet transmitted by the mobile device 10. After the header has been received, the controller 31 controls the switch 19 to connect different one of the antenna elements 32A, 32B, 32C to the LNA 21 in a sequence. The interval between successive switching of the switch 19 is approximately equal to the symbol rate used in the payload of the transmitted packets.

The signal strength measurement module 28 is configured to determine a measure of the strength of the received signals, as provided by the output of the sampler 25. The controller 31 is configured to receive an output of the signal strength measurement module 28.

The controller 31 is configured to determine whether a predetermined criterion is met, and to form a message including the I and Q samples depending on the outcome of the determination. Determining whether a predetermined criterion is met is explained in more detail below. Briefly, though, the controller 31 is configured to determine whether the identifier is included in an allow list 35A, that is stored in the storage/memory 33. If the identifier is determined to be present in the allow list, the controller 31 determines whether the measure of signal strength meets a criterion with respect to a parameter that is included in a record in the allow list associated with the identifier. In the event of a positive determination, the message former 27 is controller to form a message including the I and Q samples and the identifier and to transmit the message to a server 48 (described below). In the event of a negative determination, the controller 31 discards the I and Q samples without the message former 27 including them in a message. If the controller 31 determines that the identifier is not included in the allow list 35A, the message former 27 is controlled to form a message including the I and Q samples for transmission to the server 48 regardless of whether a test to determine whether signal strength measure meets the predetermined criterion is performed. The controller 31 is configured also to determine whether the received identifier is included in a deny list 35D, that is stored in the storage/memory 33. If the identifier is included in the deny list 35D, the controller 31 discards the I and Q samples without the message former 27 including them in a message. In the above, comparison of the signal strength measure to a value that corresponds to the identifier is performed only if the identifier is included in the allow list. In other embodiments, allow lists and deny lists are not used.

When so controlled by the controller 31, the message former 27 generates a message comprising I and Q samples of the downconverted signals from each of the antenna elements 32A, 32B, 32C and the identifier. The message is then passed to a communications interface 29. The communications interface 29 may include one or more of the antenna elements 32A, 32B, 32C.

The message may include plural packets, each including a header and a payload. The headers of the packets include an identifier relating to and identifying the base station 30, and the address of the server 48. The payloads include the I and Q samples and the identifier demodulated from the signals received by the base station 30. The payloads may also include the signal strength measure provided by the signal strength measurement module 28. The I and Q samples and identifier relating to one signal received at the base station 30 may be included in one packet, or split across multiple packets. One packet may include I and Q samples and identifiers relating to two or more signals received at the base station 30, although advantageously each packet relates to only one signal. In the following, the one or more packets relating to one beacon signal received from a mobile device is referred to as a positioning packet. Where this includes plural physical packets, the reconstructed message is termed the positioning packet, although it may at this stage be absent of a header.

In a prototype system constructed by the inventors, sixteen antenna elements 32A are used. In this system, each antenna element is sampled twice although one antenna element (a reference element) is sampled more frequently. Performing three measurements results in 104 samples which, with one byte for each I and Q sample, totals 208 bytes of data. These bytes are included in the message.

The I and Q samples constitute complex signal parameters in that the I and Q samples together define parameters of a complex signal.

Instead of transmitting 'raw' I and Q samples, the controller 31 may process the I and Q samples to provide other complex signal parameters relating to the received signals, from which bearing calculation can be performed. For instance, the controller 31 may provide averaging of the I and Q samples in the angle/phase domain before converting the averages back to the I and Q domain (one sample for each antenna) and providing the averaged samples as complex signal parameters. Alternatively, the controller 31 may calculate amplitude and/or phase information from the I and Q samples, and provide the amplitude, phase or phase and amplitude information as complex signal parameters Whatever form is taken by the complex signal parameters, they are included in a message as described above.

The message is transmitted to the server, for instance using radio signals. The radio signals may have a transmission range of 100 meters or less. For example, the radio frequency signals may be 802.11 wireless local area network (WLAN) signals, Bluetooth or Bluetooth Low Energy signals, Ultra wideband (UWB) signals or Zigbee signals.

Figure 3:
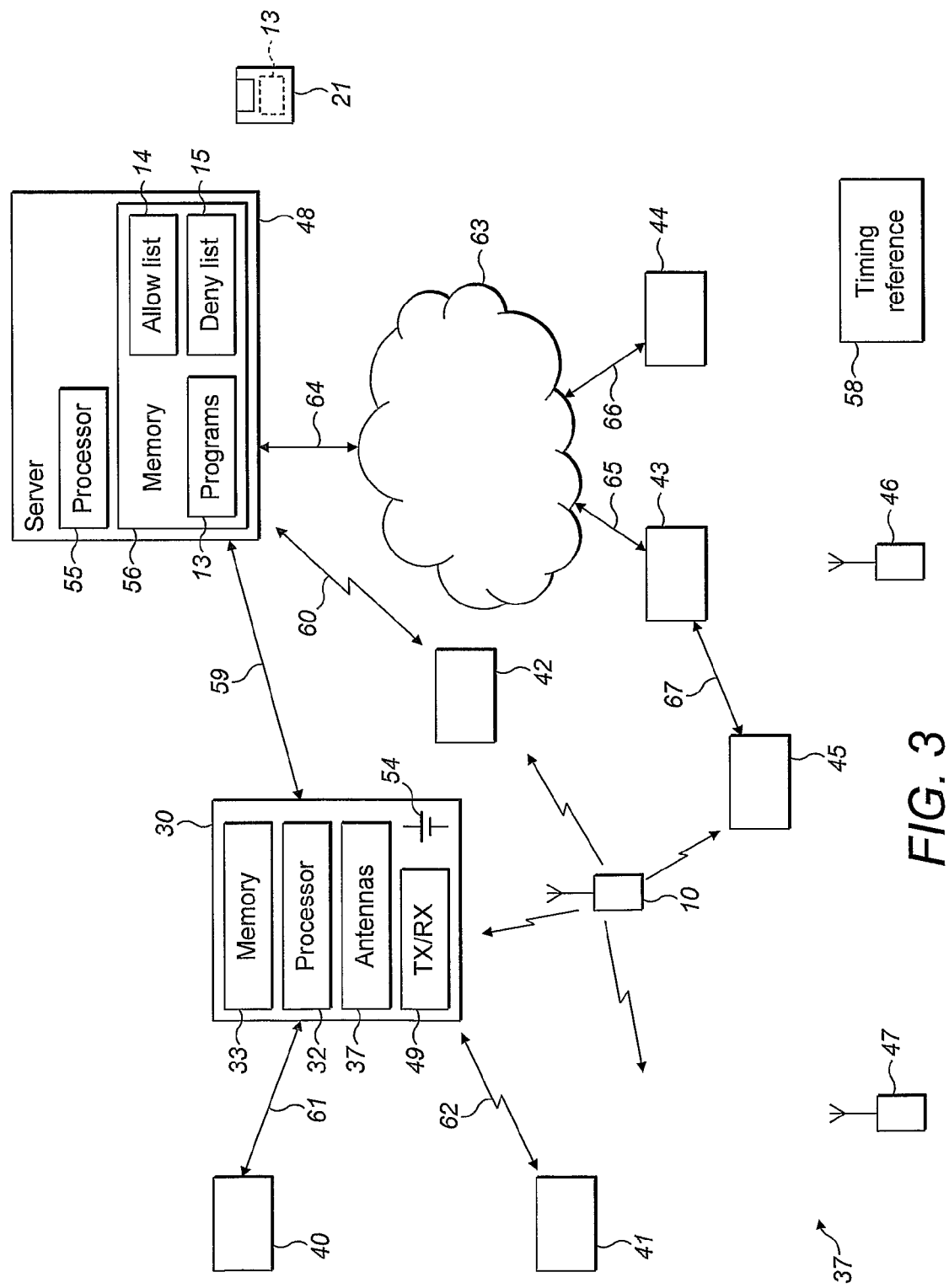
FIG. 3 is a schematic diagram of a system embodying aspects of the invention.

FIG. 3 is a schematic diagram illustrating a system 37 including the base station 30 and the mobile device 10. The base station 30 is a first base station in a plurality of base stations, second to seventh ones of which are labelled at 40 to 45 respectively. The mobile device 10 is a first mobile device amongst a plurality of devices, second and third ones of which are illustrated at 46 and 47 respectively. A server 48 is connected either directly or indirectly to each of the plural base stations 30, 40 to 45.

The first to seventh base stations 30, 40 to 45 are provided at various locations around a zone of interest. The zone of interest may, for example, be an office building or a shopping centre, as discussed above. The distribution of the base stations around the zone of interest allows the locations of mobile devices 10, 46, 47 within the zone of interest to be determined.

The first to seventh base stations 30, 40 to 45 are the same as one another, unless otherwise stated. Some components of the first base station 30 are shown in FIG. 3, and it will be appreciated that these are included also in the other base stations but are omitted from the Figure for the sake of clarity. The first base station 30 is shown as including antennas 38, a transmitter/receiver interface 49, which may include the communications interface 29 of FIG. 2, one or more memories 33 and one or more processors 32. The first base station 30 also includes a power supply 54, which is shown as a battery in FIG. 3, although it may alternatively be a connection to a mains power supply for instance.

The server 48 constitutes computing apparatus. The server 48 includes one or more processors 55 and one or more memories 56. The server 48 also is connected to a database 57, which may be internal to the server 48 or may be external. The server 48 is so-called because it has processing resources that exceed the resources of other components of the system 37, by a significant degree.

The system 37 also includes a timing reference 58, which may take any suitable form. The timing reference 58 provides a source of reference time to various components of the system 37, including the base stations 30, 40 to 45 and the server 48. The timing reference 58 may also provide reference time to the mobile devices 10, 46, 47.

FIG. 3 illustrates alternative ways in which the plurality of base stations may be connected to the server 48. Some base stations may be connected directly to the server by wired links, for instance Ethernet links. The first base station 30 is shown as being connected directly to the server 48 by a first wired link 59. Other ones of the plurality of base stations 42 are connected directly to the server 48 by wireless links. The fourth base station 42 is shown as connected to the server 48 by a first wireless link 60. Other base stations are connected to the server 48 by an intermediary. In the Figure, the second base station 40 is shown as connected to the server 48 by way of a second wired link 61 to the first base station and the first wired link 59 between the first base station 30 and the server 48. When acting as a router, a computer program (not shown) stored in the memory 33 of the first base station 30 is executed by the processor 32 in such a way as to control the transmitter/receiver interface 49 to receive packets and to retransmit them. The first and second wired links 59, 61 are bidirectional, and the first base station 30 is operable to route packets both from the second base station 40 to the server 48 and from the server 48 to the second base station 40.

An indirect link between a base station and the server 48 may involve links of different types. For instance, the third base station 41 is connected to the server 48 by a second wireless link 62 between the third base station 41 and the first base station 30 and by way of the first wired link 59 between the first base station 30 and the server 48. When acting as a router between the third base station 41 and the server 48, a computer program 33 stored in the memory 52 of the first base station 30 is executed by the processor 52 to control the transmitter/receiver interface 49 to receive wireless packets from the second base station, convert protocol as necessary and transmit packets on the first wired link 59 to the server 48. The first base station 30 also is operable to receive packets from the server 48 via the first wired link 59 and to forward them as wireless packets via the second wireless link 62 to the second base station 41.

The first base station 30, as well as any other base station that serves to route packets, routes packets by detecting a destination address in a packet header, deciding on a route using predefined rules that are stored in the base station and passing the packet externally via its transmitter/receiver interface 49.

Base stations may be connected to the server 48 via an intermediary network, rather than being connected directly or indirectly via other base stations. For instance, as shown in FIG. 3 the fifth to seventh base station 43 to 45 are connected to the server 48 by an intermediary network 63. The network may be an Internet protocol (IP) network, for instance the Internet or an intranet. A third wired link 64 between the server 48 and the network 63 allows communication between the server 48 and the fifth and sixth base stations 43, 44 by virtue of fourth and fifth wired connections 65, 66 between the base stations 43 and 44 and the network 63. The seventh base station 45 is connected to the network 63 by way of a sixth wired link 67 to the fifth base station 43, which acts as a router between the seventh base station 45 and the network 63.

The connection of the server 48 to the fifth to seventh base stations 43 to 45 via the network 63 allows the server 48 to be located remote from the base stations. For instance, the server 48 could be located at premises of a positioning service provider, and may be in a different country or even on a different continent to the base stations 43 to 45. Packets are able to be passed between the server 48 and the fifth to seventh base stations 43 to 45 by way of routing enabled by destination address information included in packet headers.

Since the first to seventh base stations 30, 40 to 45 are located in the same zone of interest, a mobile device, such as the first mobile device 10, may be within range of a number of the base stations. In FIG. 3, transmissions of the first mobile device 10 are illustrated to be receivable by the first, third, fourth and seventh base stations 30, 41, 42 and 45. However, the strength of signals received at the base stations from the first mobile device 10 depends on a distance of the first mobile device and the respective base station 30, 41, 42, 45, the bearing between the first mobile device 10 and the base station and the nature of any obstacles in the line of sight between the mobile device and the base station. Assuming that the base stations 30, 41, 42, 45 receive the same transmission of the first mobile device 10, the strength of the signal received is likely to be different for each base station. The strength of the signal may be represented, for instance by a measure of signal power.

Messages formed by the base stations 30, 40 to 45 are forwarded to the server 48 as positioning packets.

The processing circuitry 55 of the server 48 operates to process complex signal parameters, which in the following are assumed to be I and Q samples, received as messages from base stations to estimate a bearing from the mobile device 10 to the respective base station 30. The processing circuitry 55 of the server 48 operates also to estimate, using the bearing, a position of the mobile device 10. Estimation of the position of the apparatus may involve using constraint information that is independent of the radio signals 50. The estimation may involve determining the position of the mobile device 10 along the bearing 82. Alternatively or in addition, it may involve using I and Q samples generated by plural base station receiver apparatuses 30 and using triangulation to determine the location of the mobile device 10.

The server 48 maintains an allow list 14 and a deny list 15. The deny list 15 and the allow list 14 are populated based on information received from the base stations 30, 40-45 and other sources. The deny list 35D and allow list 35A stored in the base stations 30, 40-45 may be copies of the allow list 14 and the deny list 15 that are produced by and stored at the server 48.

The deny list 15 includes a number of records, each of which includes an identifier or address relating to a different mobile device, for instance one of the mobile devices 10, 46, 47. Some or all of the records may also include a time field, including a time value. The time value may relate to a time at which the record was added to the deny list 15. Alternatively, the time may indicate an expiry time of the record. If no time value is included in a record, the record can be considered to be permanently present in the deny list, although it can be removed. Records may be added to the deny list 15 by an administrator or an external system, for instance. The inclusion of a record on the deny list 15 prevents the bearing/location of the identified mobile device 10, 46, 47 being determined by the server 48.

The allow list 14 allows a number of records, each including an identifier or address and a threshold value. Some or all of the records may also include a time value in a time field. The time value may relate to a time at which the record was added to the allow list 14. Alternatively, the time may indicate an expiry time of the record. The inclusion of a record on the allow list 14 indicates that a beacon signal transmitted by the corresponding mobile device 10, 46, 47 has been received relatively recently by one of the base stations 30, 40-45. The threshold value determines a minimum power that is needed by a signal received at a base station 30 for I and Q samples of the signal to be sent to the server 48 for processing. The threshold value may, for instance, be dependent on a measured power of a strongest signal received within a predetermined time (if the signal was received prior to the predetermined time, it would be expired). The threshold may for instance be a quantity below the power of the strongest signal. The threshold may be measured in dB, or some other logarithmic scale. The threshold may be 10 dB below the power of the strongest signal.

The processing circuitry 55 may be any type of processing circuitry. For example, the processing circuitry 55 may be a programmable processor that interprets computer program instructions 13 and processes data. The processing circuitry 55 may include plural programmable processors. Alternatively, the processing circuitry 55 may be, for example, programmable hardware with embedded firmware. The processing circuitry 55 may be a single integrated circuit or a set of integrated circuits (i.e. a chipset). The processing circuitry 55 may also be a hardwired, application-specific integrated circuit (ASIC). The processing circuitry may be termed processing means.

The processing circuitry 55 is connected to write to and read from the storage device 56. The storage device 56 may be a single memory unit or a plurality of memory units.

The storage device 56 may store computer program instructions 13 that, when loaded into processing circuitry 55, control the operation of the server 48. The computer program instructions 13 may provide the logic and routines that enables the server 48 to perform the method illustrated in FIG. 5, described below.

The computer program instructions 13 may arrive at the server 48 via an electromagnetic carrier signal or be copied from a physical entity 21 such as a computer program product, a memory device or a record medium such as a CD-ROM or DVD.

Operation of the base station 30 will now be described with reference to the flow chart of FIG. 4. As a preliminary step, the base station 30 is provided with copies 35A and 35D of the deny list 15 and the allow list 14 lists that are produced by and stored at the server 48.

Figure 4:
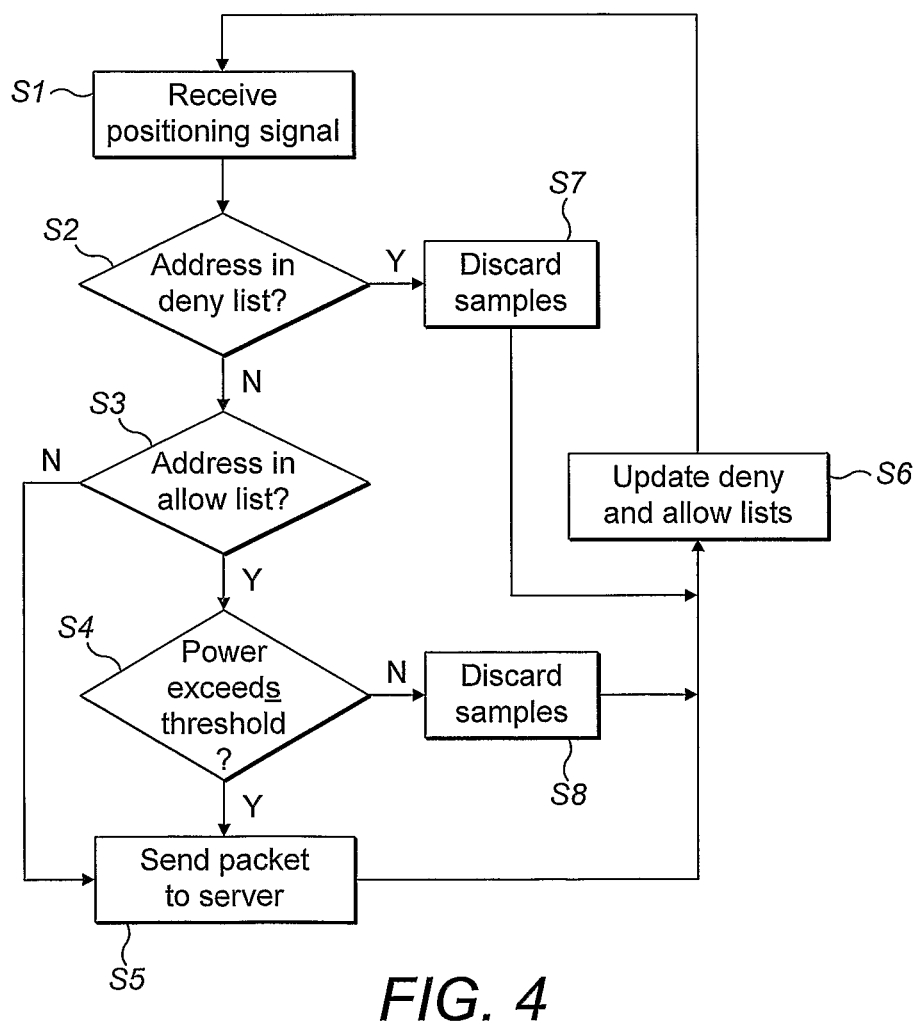
FIG. 4 is a flow chart illustrating operation of the FIG. 2 receiver apparatus according to aspects of the invention.

Referring to FIG. 4, operation starts at step S1 where a positioning signal or positioning beacon is received from the mobile device 10 at the base station 30.

The base station 30 then partially processes the signal to demodulate the identifier from the signal, as explained above with reference to FIG. 2. The base station 30 also measures the power of the received signal, as explained above. The power may be measured in dB.

At step S2, the base station 30 determines whether the identifier (which constitutes an address) that is demodulated from the received positioning signal is included in the deny list 35D. On a negative determination, the operation proceeds to step S3. Here, the base station 30 determines whether the identifier is included in the allow list 35A. On a positive determination, the operation proceeds to step S4. Here, the base station 30 determines whether the measured power of the received signal exceeds the threshold provided in the record in the allow list 35A that includes the identifier. The threshold may have a value in dB.

In response to a positive determination, indicating that the received signal is nearly as powerful as or more powerful than a recently received signal with the highest power, the operation proceeds to step S5. Here, a positioning packet including the I and Q samples is formed by the message former 27 and sent to the server 48. Following step S5, the base station 30 updates the deny and allow lists 35A, 35D at step S6. Following step S6, the operation proceeds again to await a new positioning signal at step S1.

In response to a positive determination from step S2, the I and Q samples are discarded at step S7 and the operation proceeds to step S6.

In response to a negative determination from step S4, the I and Q samples are discarded at step S8 and the operation proceeds to step S6.

Step S6 involves updating the deny and allow lists 35A, 35D to remove entries or records that have expired. For instance, where the deny and allow lists 35A, 35D include expiry times in time fields, step S6 involves deleting records where the value in the time field is in the past. Where the time fields of the deny and allow lists 35A, 35D include start times, step S6 may involve adding a validity time to the start time and determining whether the result of the addition is in the past. The validity time may be different for records in the deny list 35D than for records in the allow list 35A. For instance, the validity time for records in the allow list 35A may be of the order of seconds, tens of seconds or in some cases minutes, and may be considerably longer than for records in the deny list 35D.

In response to a negative determination in step S3, operation proceeds to step S5, where a packet including the I and Q samples is sent to the server 48. In this way, the power of the received signal is not compared to the threshold when the identifier is not included in the allow list. The absence of the identifier from the allow list indicates that any records that have been created for that identifier have expired and thus have been deleted.

Step S6 also may involve contacting the server to receive information about updates from the copies stored there. This may result in deletion of records from the deny and allow lists that have not yet expired. This may also result in changes in the threshold values for records in the allow list. It may also result in the addition of new records to either or both of the deny and allow lists.

Although step S6 is shown as being performed prior to step S1, this is merely an example. Alternatively, step S6 could be performed on a periodic basis, for instance every 10 or 20 seconds. Alternatively, step S6 could be performed between steps S1 and S2. Alternatives will be envisaged by the person skilled in the art.

Figure 5:
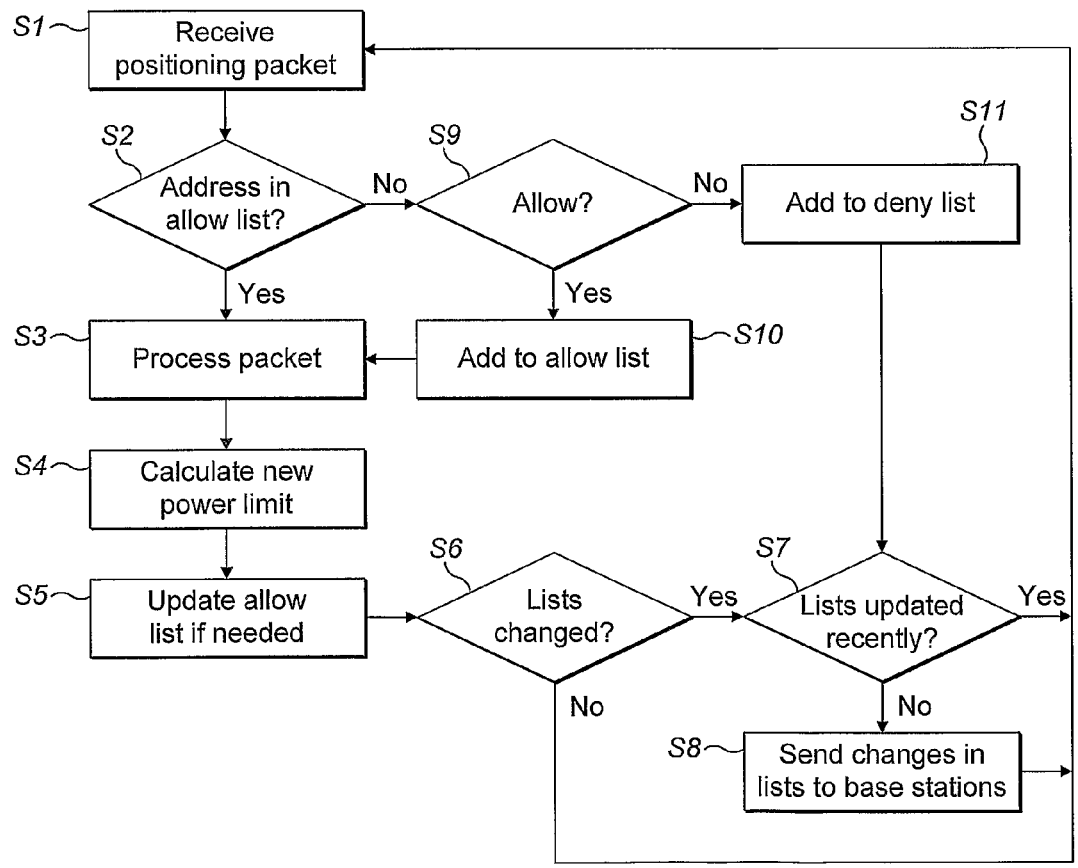
FIG. 5 is a flow chart illustrating operation of a server of the FIG. 3 system, according to aspects of the invention.

FIG. 5 illustrates operation of the server 48.

At step S1, a positioning packet is received from a base station 30, 40-45. As stated above, the positioning packet includes a header that includes information about the originating base station 30, 40 to 45 and the address of the server, and possibly also other information. The payload of the packet includes the identifier that was transmitted by the mobile device 10 and received by the base station 30, 40 to 45 and the I and Q samples provided by the sampler 25 of the base station.

At step S2, the server 48 determines whether the identifier, which can also be termed an address, included in the payload of the packet is included in the allow list 14. In the event of a positive determination, the operation proceeds to step S3 where the packet is processed. Processing of the packet involves the server 48 determining a bearing of the mobile device 10 from the base station 30, 40 to 45, and may optionally comprise calculating the location of the mobile device 10 from the bearing. This is described in more detail below.

Following step S3, a new power limited is calculated at step S4. This step involves determining whether the power of the signal relating to the positioning packet that is being processed exceeds the power value that is recorded in the record in the allow list 14 against the corresponding identifier. If the power value of the positioning packet does not exceed the value in the allow list 14, the power limit is not updated. At step S5, the allow list 14 is updated if in step S4 is it calculated that the power of the received positioning packet exceeds that of the power stored in the allow list 14.

At step S6, it is determined if the 14 was updated in step S5. If the allow list 14 was updated, at step S7 the server 48 determines whether the allow and deny lists 35A, 35D were updated at the base stations 30, 40 to 45 recently. In response to a positive determination, the operation proceeds again to step S1, where a new positioning packet is awaited. In the event of a negative determination at step S7, at step S8 the server 48 sends changes in the lists to the base stations 30, 40 to 45.

In response to a negative determination at step S2, the server 48 at step S9 determines whether or not to allow the mobile device 10 corresponding to the identifier to be included in the allow list 14. This determination may be made by the system checking whether the user has paid for or alternatively consented having its position determined. The determination might also be based on priorities (i.e. different tags/users may have different priorities) and/or on whether there is sufficient capacity left in the server. In response to a positive determination, the mobile device 10 is added to the allow list 14 at step S10, and operation proceeds to process the packet at step S3. In this case, step S4 calculates a power limit for the mobile device 10 as being the power of the signal corresponding to the received positioning packet, and the allow list 14 is updated at step S5 accordingly.

If at step S9 a negative determination results, the mobile device 10, in particular the identifier thereof, is added to the deny list 15 at step S11. Following step S11, the operation proceeds to step S7, which is described above.

If the allow list 14 is updated at step S5, a time field forming part of the record attached to the identifier associated with the received positioning packet is provided with a time value. This may be the time at which step S5 is performed, or alternatively be the time at which the corresponding positioning packet was received by the server 48. Alternatively, the time value recorded in the allow list 14 could indicate the time at which the corresponding signal was received by the originating base station 30, 40 to 45. If the allow list 14 includes expiry times, the time field is provided with a value that is equal to the relevant time plus the validity period.

Similarly, if at step S11 the mobile device 10 is added to the deny list, a time field forming part of the record may be populated in any suitable way, for instance in one of the ways described above with respect to the allow list.

It will be appreciated that steps S6, S7 and S8 can be omitted if there is some other mechanism for updating allow and deny lists 35A, 35D in the base stations 30, 40 to 45.

Step S4 involves knowledge of the power of the signal received at the base station 30, 40-45. This may be provided by the base station 30, 40 to 45, for instance as part of the payload of the received positioning packet. In this case, the base station 30, 40 to 45, in particular the controller 31 thereof, includes a measurement of power provided by the power measurement module 28 into the message provided by the message former 27 and transmitted by the communications interface 29. Alternatively, the server 48 may calculate the power of the received signal from the I and Q samples, for instance as part of the packet processing of step S3.

Optionally, step S5 updates the allow list 14 regardless of whether the power of the received positioning packet exceeds the value stored in the record. Here, the existing record is maintained in the allow list 14, so that the allow list includes two (or more) records for the mobile device 10, 46, 47 from which the positioning signal originated. Since different records have different expiry times, the record relating to the higher power will usually be deleted from the allow list 14 before the record relating to the lower power expires. This reduces the chances that a received positioning packet will not relate to a mobile device 10, 46, 47 included in the allow list 14. Furthermore, it increases the chances of low power signals being discarded without being transmitted by a base station 30, 40-45 to the server 48, thereby improving system performance.

The computer program instructions 13 stored at the server 48 provide instructions for processing data representing in-phase and quadrature samples of signals transmitted by a mobile device and received at each of the antenna elements 32A, 32B, 32C forming part of the base station 30 and to calculate therefrom a bearing of the mobile tag from the positioning device.

The server 48 operates to obtain 'displacement information' from the signals 50A, 50B, 50C, as sampled and included in the message sent from the base station 30, that is dependent upon inter alia the relative displacements of the respective antenna elements 32A, 32B, 32C. In the example described in detail here, the displacement information includes phase information.

The processing circuitry demodulates the sampled I and Q waveform using I-Q modulation, also known as quadrature phase shift modulation. In this demodulation technique, the complex samples reflect the amplitude of the two orthogonal carrier waves. The processing circuitry 55 processes the complex samples to determine the closest matching symbol. It should be appreciated that an identical signal received at different antenna elements are received with different phases and amplitudes because of the inherent phase characteristics of the antenna elements 32 when receiving from different directions and also because of the different times of flight for a signal 50 to each antenna element 32 from the mobile device 10. The inherent presence of this 'time of flight' information within the phases of the received signals 50 enables the received signals 50 to be processed, as described in more detail below, to determine the bearing 82 of the mobile device 10 from the base station 30.

Figure 6:
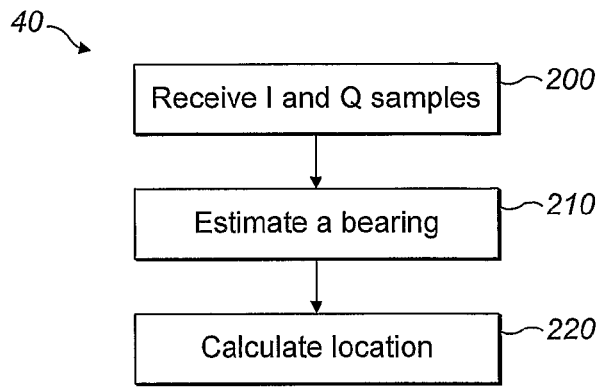
FIG. 6 is a flow chart illustrating a positioning method performed by the server.

FIG. 6 illustrates a method for estimating the position of the mobile device 10. Various embodiments of the method of FIG. 6 will be described hereinafter.

The respective spatially diverse received radio signals 50A, 50B, 50C are received at the base station 30 as illustrated in FIGS. 1 and 2. At block 200 of the method of FIG. 4, the mobile device 10 receives the message containing I and Q samples of first, second and third radio signals 50A, 50B, 50C incident on the base station 30.

At block 210, the processing circuitry 55 uses the I and Q samples to estimate a bearing 82 of the mobile device 10 from location 80 of the base station 30.

One method of determining the bearing 82 is now described, but other methods are possible.

Once complex samples from each antenna element 32 are obtained, the array output vector y(n) (also called as snapshot) can be formed at by the processor 12:

$$y(n)=[x_1,x_2,\ldots,x_M] \quad (1)$$

Where $x_i$ is the complex signal received from the ith antenna element 32, n is the index of the measurement and M is the number of elements 32 in the array 36.

An Angle of Arrival (AoA) can be estimated from the measured snapshots if the complex array transfer function $a(\phi,\theta)$ of the RX array 36 is known, which it is from calibration data.

The simplest way to estimate putative AoAs is to use beamforming, i.e. calculate received power related to all possible AoAs. The well known formula for the conventional beamformer is $$P_{BF}(\phi,\theta)=a^*(\phi,\theta)\check{R}a(\phi,\theta) \quad (2)$$

Where, $$\check{R} = \frac{1}{N}\sum_{n=1}^{N} y(n)y*(n)$$

is the sample estimate of the covariance matrix of the received signals, $a(\phi,\theta)$ is the array transfer function related to the DoD($\phi,\theta$). $\phi$ is the azimuth angle and $\theta$ is the elevation angle.

Once the output power of the beamformer $P_{BF}(\phi,\theta)$ is calculated in all possible AoAs, the combination of azimuth and elevation angles with the highest output power is selected to be the bearing 82.

The performance of the system depends on the properties of the array 36.

For example the array transfer functions $a(\phi,\theta)$ related to different AoAs should have as low correlation as possible for obtaining unambiguous results.

Correlation depends on the individual radiation patterns of the antenna elements 32, inter element distances and array geometry. Also the number of array elements 32 has an effect on performance. The more elements 32 the array 36 has the more accurate the bearing estimation becomes. In minimum there are at least 3 antenna elements 32 in planar array configurations but in practice or more elements provide better performance.

Next, at block 220 the processor 55 estimates a position of the mobile device 10. This may involve the processor 55 estimating a position of the apparatus using the bearing and constraint information. The use of constraint information enables the processor 55 to determine the location of the mobile device 10 along the estimated bearing 82.

Figure 7:
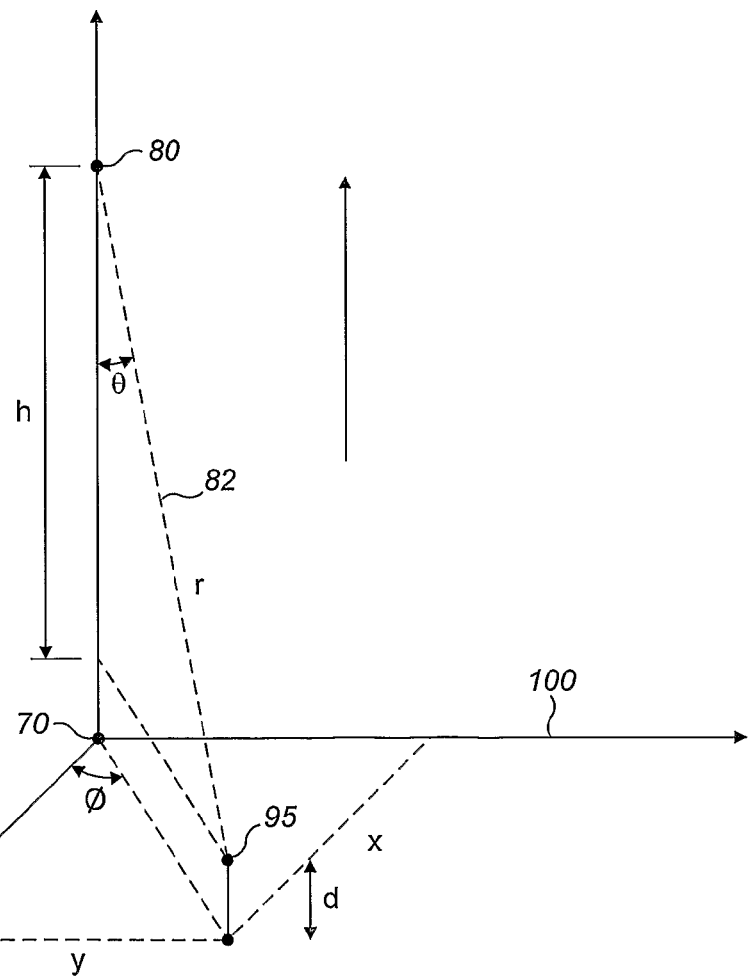
FIG. 7 illustrates estimating the position using a displacement or range as a constraint.

FIG. 7 also illustrates the bearing 82 from the location 80 of the base station 30 to the location 95 of the mobile device 10, which has been estimated by the processor 55 following reception of the radio signals 50. The bearing 82 is defined by an elevation angle $\theta$ and an azimuth angle $\phi$ The processor 55 may estimate the position of the mobile device 10 relative to the location 80 of the base station 30 in coordinates using the bearing (elevation angle $\theta$ and azimuth angle $\phi$) and constraint information e.g. vertical displacement h (FIG. 7) or an additional bearing or a range r. The processor 55 may estimate the position of the mobile device 10 in Cartesian coordinates by converting the coordinates using trigonometric functions.

Using information identifying the location and orientation of the base station 30, the server 48 can calculate the absolute location of the mobile device 10 from the bearing and the constraint information. The information identifying the location and orientation of the base station 30 may be received at the server 48 in any suitable way. For instance, it may be provided to the server 48 during system set-up.

Alternatively, block 220 may involve triangulating from two base stations 30, 40-45. In this case, constraint information is not required, although the use of constraint information is not precluded. In this alternative, block 200 involves receiving messages from two base stations 30, 40-45. Each message relates to the mobile device 10, as is determined by the mobile device 10 from the identifier that is included in the messages by the base stations 30. Block 210 is performed for each of the base stations, providing two bearings. Block 220 involves the server 48 using information identifying the location and orientation of both of the base stations 30, 40-45 and the bearings therefrom to calculate its absolute location through triangulation.

The use of the bearing/location information is not described in detail here. The bearing/location information may be used for any purpose, and may be provided to any apparatus in any suitable way.

The above described system allows a server 48 to calculate the location of the mobile device 10 without access to GPS or other satellite based system. Moreover, this is achieved with a relatively simple infrastructure which in its simplest form comprises a multi-antenna receiver, a signal sampling means and a sample transmission means. Additionally, with relatively modest system constraints, the position so calculated can be considerably more accurate than locations provided by other such systems.

Features of the embodiments described above provide advantages in that only the mobile-transmitted signals that provide the best positioning of the originating mobile devices are transmitted for processing. This can reduce network and computational loads without negatively impacting on system performance. Greater advantage is experienced with systems involving greater numbers or concentrations of base stations. Also, system performance can in some instances be improved, particularly by rejecting signals, for instance reflected signals, that might otherwise cause erroneous position estimates.

In the above embodiments, the base stations 30, 40 to 45 determines the power of the signal received from the mobile device 10. Alternatively, the power of the received signal may be determined by the server 48 upon receipt of the corresponding positioning packet from the base stations 30, 40 to 45. In this embodiment, less processing is required by the base station 30, 40 to 45. However, since the base station 30, 40 to 45 does not discard I and Q samples of received signals, this embodiment results in a greater number of positioning packets being sent between the base stations 30, 40 to 45 and the server 48. This embodiment does not require the maintenance of an allow list at the base station 30, 40 to 45. In this embodiment, the base stations 30, 40 to 45 may or may not maintain a deny list. Whether or not allow and deny lists 35A, 35D are maintained by the base stations 30, 40 to 45, the allow and deny lists 14, 15 are maintained and applied by the server 48. Application of the deny list 15 by the server 48 prevents the server 48 processing packets that are associated with mobile devices 10 for which positioning is currently prevented. Application of the allow list 14 prevents the server 48 performing processing of packets for which the signal strength is not sufficiently high.

Although in the above embodiments, bearing calculation and location calculation is said to be performed at the server 48, in other embodiments this may instead be performed by another device, for instance a mobile device 10, 40-45. Alternatively, bearing and location calculation may be performed by the base stations 30, 40 to 45 that received the beacon from the mobile device 10, or by another one of the base stations 30, 40 to 45. In these embodiments, step S3 of FIG. 5 does not involve processing the positioning packet to determine the bearing, but instead results in transmission of the positioning packets, or at least relevant parts of the positioning packets, to the device that is to calculate the bearing.

Although the memory 56 and the memory 33 are illustrated as single components, they may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed function device, gate array or programmable logic device etc.

In the above, the measure of strength of the received wireless signal is signal power. Alternatively, it may take any other suitable form, for instance bit error rate, etc.

The invention claimed is:

1. A method comprising:
   receiving at each of at least three antenna elements of a positioning device a wireless signal having modulated thereon an identifier relating to a transmitting device;
   obtaining complex signal parameters of a signal received at each of the at least three antenna elements;
   determining a measure of a strength of the received wireless signal;
   comparing the measure to a threshold associated with the identifier;
   if the measure exceeds the threshold, processing the complex signal parameters to determine a bearing of the transmitting device from the positioning device; and
   if the measure does not exceed the threshold, discarding the complex signal parameters without processing them to determine a bearing.

2. A method as claimed in claim 1, comprising the positioning device comparing the measure to the threshold associated with the identifier, the positioning device transmitting a message comprising the complex signal parameters for remote processing to determine the bearing of the transmitting device from the positioning device if the measure exceeds the threshold, and the positioning device discarding the complex signal parameters without first transmitting them if the measure does not exceed the threshold.

3. A method as claimed in claim 1, comprising storing a database of identifiers and one of corresponding thresholds or information from which thresholds can be derived.

4. A method as claimed in claim 3, comprising updating the database using information received from one of an external device or a remote server.

5. A method as claimed in claim 3, comprising:
   storing a list of disallowed mobile devices;
   determining if an identifier received from a transmitting device relates to a mobile device that is included in the list of disallowed mobile devices; and
   in the event of a positive determination, discarding the complex signal parameters without processing them to determine a bearing.

6. Apparatus comprising:
   at least one processor; and
   at least one memory including computer program code;
   the at least one memory and the computer program code configured to, with the at least one processor, cause the apparatus to perform:
   obtaining complex signal parameters for a signal received at each of at least three antenna elements, the wireless signal having modulated thereon an identifier relating to a transmitting device;
   determining a measure of a strength of the received wireless signal;
   comparing the measure to a threshold associated with the identifier;
   responsive to a determination that the measure exceeds the threshold, processing the complex signal parameters to determine a bearing of the transmitting device from the positioning device; and
   responsive to a determination that the measure does not exceed the threshold, discarding the complex signal parameters without processing them to determine a bearing.

7. Apparatus as claimed in claim 6, wherein the at least one memory and the computer program are further configured to, with the at least one processor, cause the apparatus to perform: comparing the measure to the threshold associated with the identifier; transmitting a message comprising the complex signal parameters for remote processing if the measure exceeds the threshold; and discarding the complex signal parameters without first transmitting them if the measure does not exceed the threshold.

8. Apparatus as claimed in claim 6, comprising a memory storing a database of identifiers and one of corresponding thresholds or information from which thresholds can be derived.

9. Apparatus as claimed in claim 8, wherein the at least one memory and the computer program are further configured to, with the at least one processor, cause the apparatus to perform updating the database using information received from a remote server.

10. Apparatus as claimed in claim 8, wherein the memory stores a list of disallowed mobile devices, and the at least one memory and the computer program are further configured to, with the at least one processor, cause the apparatus to perform: determining if an identifier received from a transmitting device relates to a mobile device that is included in the list of disallowed mobile devices; and, in the event of a positive determination, discarding the complex signal parameters without processing them to determine a bearing.

11. Apparatus as claimed in claim 6, wherein the measure of strength of the received wireless signal is signal power.

12. A non-transitory machine readable medium comprising computer code stored thereon that when executed by a processor causes an apparatus to perform a method comprising:

obtaining complex signal parameters of a wireless signal received at each of at least three antenna elements of a positioning device;
determining a measure of a strength of the received wireless signal;
comparing the measure to a threshold associated with an identifier modulated onto the received wireless signal;
if the measure exceeds the threshold, processing the complex signal parameters to determine a bearing of the transmitting device from the positioning device; and
if the measure does not exceed the threshold, discarding the complex signal parameters without processing them to determine a bearing.

* * * * *